US012688451B2

(12) United States Patent
Golter et al.

(10) Patent No.: US 12,688,451 B2
(45) Date of Patent: Jul. 21, 2026

(54) SYSTEMS AND METHODS FOR SCALABLE CONTROL OF SPIN QUANTUM MEMORIES

(71) Applicants: The MITRE Corporation, McLean, VA (US); National Technology & Engineering Solutions of Sandia, LLC, Albuquerque, NM (US); MASSACHUSETTS INSTITUTE OF TECHNOLOGY, Cambridge, MA (US)

(72) Inventors: Andrew Golter, McLean, VA (US); Genevieve Clark, McLean, VA (US); Tareq El Dandachi, McLean, VA (US); Stefan Krastanov, McLean, VA (US); Matthew Zimmermann, McLean, VA (US); Andrew Greenspon, McLean, VA (US); Noel Wan, McLean, VA (US); Hamza Raniwala, McLean, VA (US); Kevin Chen, McLean, VA (US); Linsen Li, McLean, VA (US); Andrew Leenheer, McLean, VA (US); Mark Dong, McLean, VA (US); Gerald Gilbert, McLean, VA (US); Matthew Eichenfield, McLean, VA (US); Dirk Englund, McLean, VA (US)

(73) Assignees: The MITRE Corporation, McLean, VA (US); National Technology & Engineering Solutions of Sandia, LLC, Albuquerque, NM (US); MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 618 days.

(21) Appl. No.: 18/139,684

(22) Filed: Apr. 26, 2023

(65) Prior Publication Data

US 2024/0013084 A1     Jan. 11, 2024

Related U.S. Application Data

(60) Provisional application No. 63/336,877, filed on Apr. 29, 2022.

(51) Int. Cl.
G06N 10/40          (2022.01)

(52) U.S. Cl.
CPC ................................... G06N 10/40 (2022.01)

(58) Field of Classification Search
USPC ......................................................... 716/100
See application file for complete search history.

(56) References Cited

FOREIGN PATENT DOCUMENTS

WO     WO-2021011765 A1 *   1/2021   ............. B82Y 20/00

OTHER PUBLICATIONS

Choi et al., (2019). "Percolation-based architecture for cluster state creation using photon-mediated entanglement between atomic memories" npj Quantum Information 5: 1-7.

(Continued)

*Primary Examiner* — Brian Ngo
(74) *Attorney, Agent, or Firm* — Morrison & Foerster LLP

(57)          ABSTRACT
A scalable point defect qubit control system may include a diamond waveguide array comprising one or more diamond waveguides and a microwave line disposed proximally to the diamond waveguide array. Each diamond waveguide in the diamond waveguide array may include one or more qubits encoded in point defect sites. The microwave line may be configured to receive a direct current (DC) signal configured to shift an energy level of each point defect qubit of the one or more point defect qubits based on a position of (Continued)

the point defect in the diamond waveguide array, and receive an alternating current (AC) signal configured to control a quantum state of a point defect qubit of the one or more point defect qubits, wherein one or more properties of the AC signal are based on the shift in the energy level induced by the DC signal.

24 Claims, 8 Drawing Sheets

(56) References Cited

OTHER PUBLICATIONS

Dong et al., (Jan. 2022). "High-speed programmable photonic circuits in a cryogenically compatible, visible-near-infrared 200 mm CMOS architecture" Nature Photonics (16):59-65.

Nemoto et al., (Aug. 2014). "Photonic Architecture for Scalable Quantum Information Processing in Diamond" Physical Review X 4:031022. (12 pages).

Nickerson et al., (Dec. 2014). "Freely Scalable Quantum Technologies Using Cells of 5-to-50 Qubits with Very Lossy and Noisy Photonic Links" Physical Review X 4: 041041.(17 pages).

Stanfield et al., (Sep. 20, 2019). "CMOS-compatible, piezo-optomechanically tunable photonics for visible wavelengths and cryogenic temperatures" Optics Express 27(20): 28588-28605.

Wan et al., (2020). "Large-scale integration of near-indistinguishable artificial atoms in hybrid photonic circuits" Nature 583:226-231.

* cited by examiner

Figure 5:
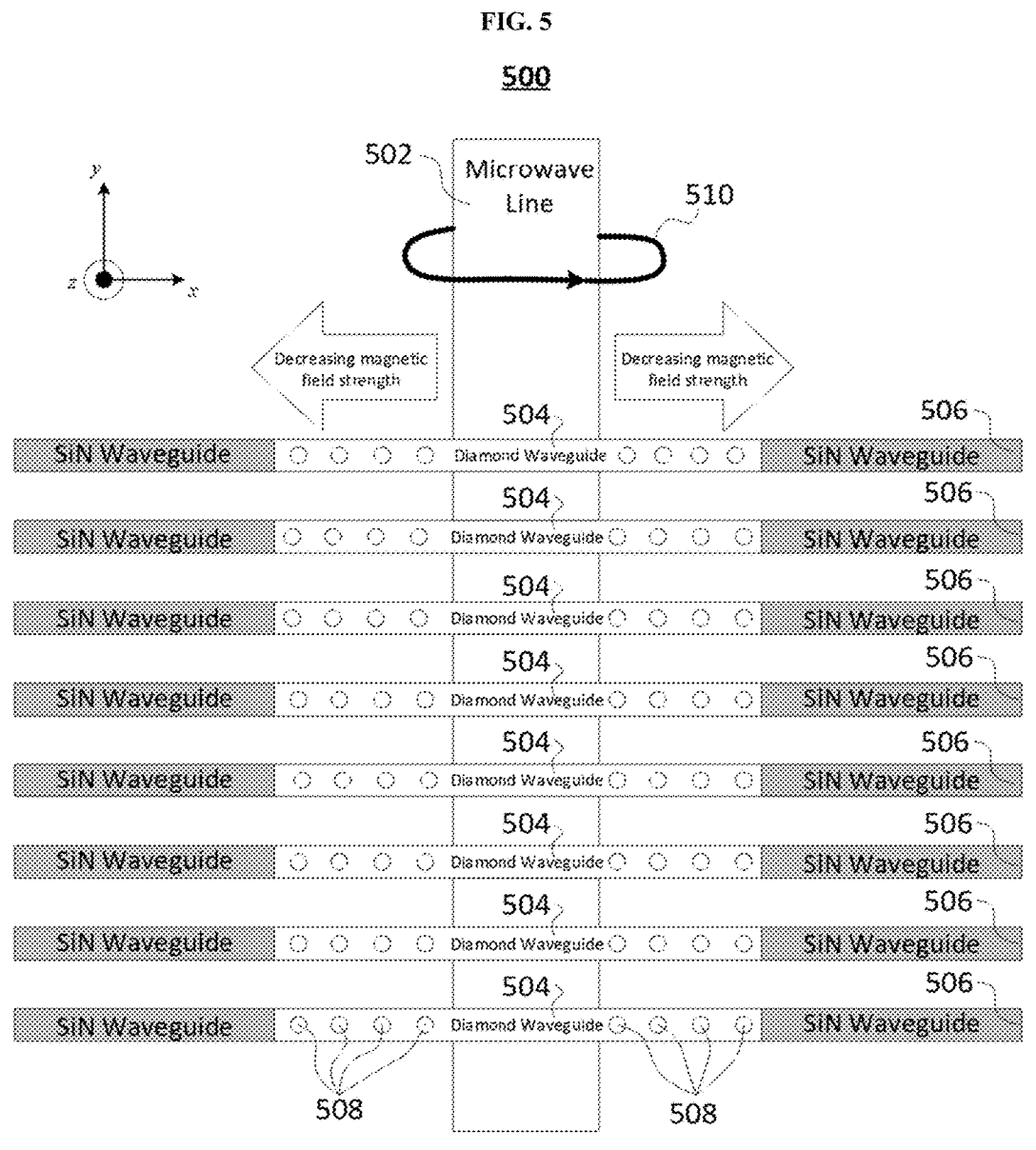

Microwave Line

502

510

Decreasing magnetic field strength

Decreasing magnetic field strength

504　Diamond Waveguide

506　SiN Waveguide

508

600

602

Apply DC signal to microwave line to assign frequency addresses to point defect sites in diamond waveguide array

604

Select point defect qubit of interest and determine AC signal shape for desired operation.

606

Apply optimally shaped AC signal to microwave line control selected point defect qubit

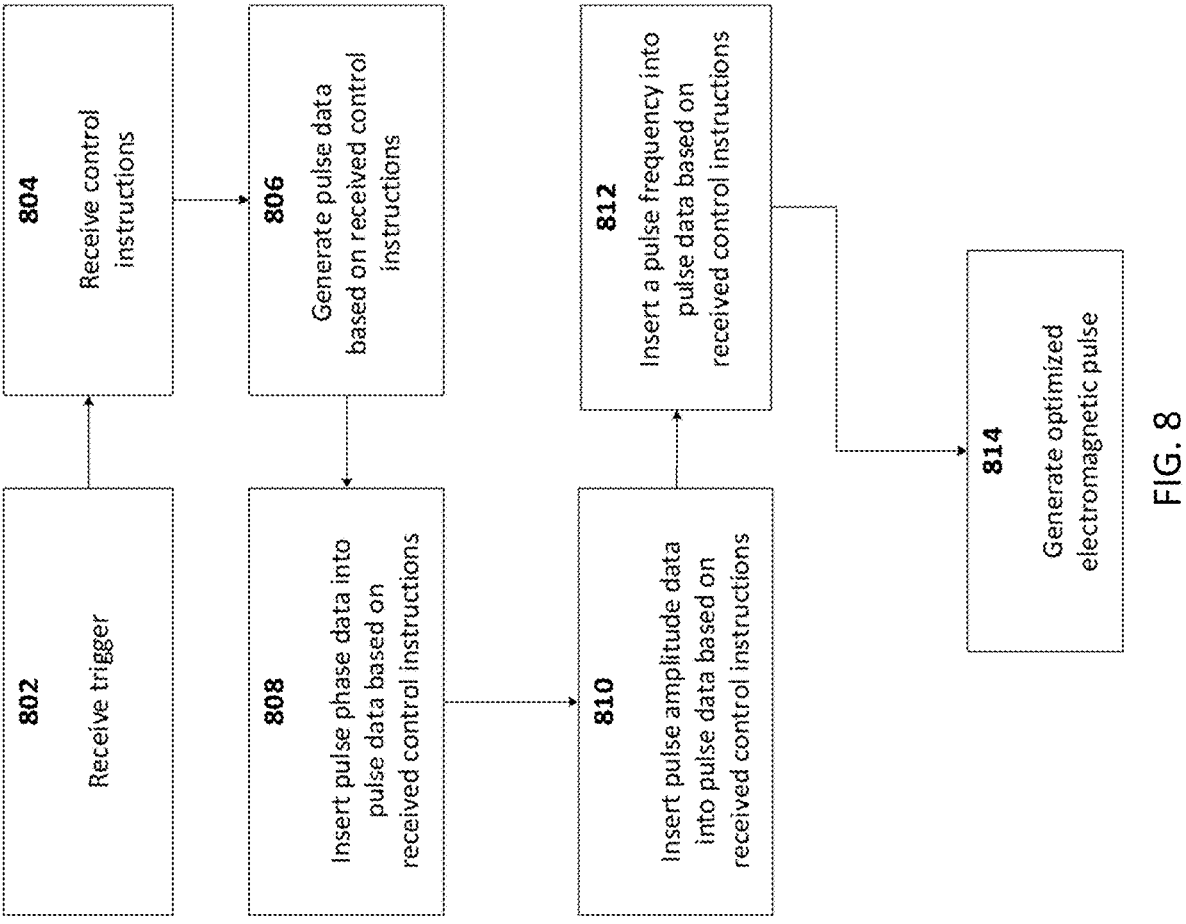

800

802
Receive trigger

804
Receive control instructions

806
Generate pulse data based on received control instructions

808
Insert pulse phase data into pulse data based on received control instructions

810
Insert pulse amplitude data into pulse data based on received control instructions

812
Insert a pulse frequency into pulse data based on received control instructions

814
Generate optimized electromagnetic pulse

FIG. 8

SYSTEMS AND METHODS FOR SCALABLE CONTROL OF SPIN QUANTUM MEMORIES

CROSS REFERENCE TO RELATED APPLICATIONS

This application claims the benefit of U.S. Provisional Application No. 63/336,877, filed Apr. 29, 2022, the entire contents of which is incorporated herein by reference.

STATEMENT REGARDING FEDERALLY SPONSORED RESEARCH OR DEVELOPMENT

This invention was made under CRADA/PTS No. SC19/1945.00.00 between The MITRE Corporation and National Technology & Engineering Solutions of Sandia, LLC operated for the United States Department of Energy. This invention was also made under contract No. DE-NA0003525 between National Technology & Engineering Solutions of Sandia, LLC and the United States Department of Energy/National Nuclear Security Administration. The Government has certain rights in this invention.

FIELD OF THE DISCLOSURE

The present disclosure relates generally to quantum computing. More specifically, the present disclosure relates to systems and methods for controlling qubits encoded in point defect sites in diamond waveguides.

BACKGROUND OF THE DISCLOSURE

Quantum computing is a type of computation that employs physical properties of quantum states to perform calculations. As a result of their ability to harness quantum mechanical properties like superposition, quantum computers have many potential advantages over classical computing systems. In particular, quantum computers are believed to be capable of performing certain calculations much faster than classical computers.

The basic unit of quantum memory is the quantum bit, or "qubit". Quantum computers perform calculations by operating on the quantum states of qubits in order to manipulate and extract information. However, inherent properties of quantum systems such as qubits make controlling qubits for extended periods of time difficult. As such, a primary challenge in the development of scalable, functioning quantum computing systems lies in the ability to accurately and efficiently control the quantum states of qubits.

SUMMARY OF THE DISCLOSURE

Qubits can be physically represented in quantum computing hardware by any two-state quantum system. One promising physical representation encodes qubits in structural defects in the crystal lattice of diamond that have an associated spin degree of freedom. Point defect sites (e.g., nitrogen vacancies (NV) or group IV vacancies) are a class of such structural defects which possess desirable optical properties which may allow them to be implemented on a large scale in quantum computing systems. In particular, the quantum states qubits encoded in point defect sites ("point defect qubits") may be controlled with electromagnetic pulses.

Described herein are systems and methods for selectively targeting and controlling individual qubits encoded in optically active defects in diamond that have associated spin degrees of freedom. In one or more examples, optimized electromagnetic signals may be used to control the quantum states of an individual point defect qubit in a system of many point defect qubits without affecting the quantum states of the other, nearby point defect qubits in said system. In one or more examples, the systems and methods of the present disclosure may be implemented in cryogenic environments.

In one or more examples, a scalable point defect qubit control system comprises a diamond waveguide array comprising one or more diamond waveguides, wherein the one or more diamond waveguides comprise one or more point defects; and a microwave line disposed proximally to the diamond waveguide array, wherein the microwave line is configured to: receive a direct current (DC) signal, wherein the DC signal is configured to shift an energy level of each point defect of the one or more point defects based on a position of the point defect in the diamond waveguide array; and receive an alternating current (AC) signal, wherein the AC signal is configured to control a quantum state of a point defect of the one or more point defects, wherein one or more properties of the AC signal are based on the shift in the energy level induced by the DC signal.

In one or more examples, the diamond waveguide array comprises at least eight diamond waveguides.

In one or more examples, the one or more point defects comprise nitrogen vacancy centers.

In one or more examples, the at least one diamond waveguide comprises at least two point defect sites.

In one or more examples, the system comprises at least one photonic waveguide optically coupled to the diamond waveguide array that is configured to receive photons emitted by the one or more point defects.

In one or more examples, the at least one photonic waveguide comprises silicon nitride.

In one or more examples, the microwave line is aligned perpendicularly to the one or more diamond waveguides in the diamond waveguide array.

In one or more examples, the AC signal is generated by a signal generating system comprising: a memory, wherein the memory stores control instructions for the one or more point defects; one or more processors; and one or more programs, wherein the one or more programs are stored in the memory and configured to be executed by the one or more processors, the one or more programs when executed by the one or more processors cause the processor to: generate pulse data based on the control instructions; insert pulse phase data into the pulse data based on the control instructions; insert pulse amplitude data into the pulse data based on the control instructions; and insert a pulse frequency into the pulse data based on the control instructions; and generate the AC signal based on the pulse data.

In one or more examples, A method for scalable control of point defect qubits comprises: at a microwave line disposed proximally to a diamond waveguide array comprising one or more diamond waveguides, wherein the one or more diamond waveguides comprise one or more point defect sites, applying a direct current (DC) signal, wherein the DC signal is configured to shift an energy level of each point defect site of the one or more point defects based on a position of the point defect in the diamond waveguide array; and applying, at the microwave line, an alternating current (AC) signal, wherein the AC signal is configured to control a quantum state of a point defect of the one or more point defects, wherein one or more properties of the electromagnetic signal are based on the shift in the energy level induced by the DC signal.

In one or more examples, the diamond waveguide array comprises at least eight diamond waveguides.

In one or more examples, the one or more point defects comprise nitrogen vacancies.

In one or more examples, the at least one diamond waveguide comprises at least two point defect sites.

In one or more examples, at least one photonic waveguide is optically coupled to the diamond waveguide array and configured to receive photons emitted by the one or more point defects.

In one or more examples, the at least one photonic waveguide comprises silicon nitride.

In one or more examples, the microwave line is aligned perpendicularly to the one or more diamond waveguides in the diamond waveguide array.

In one or more examples, the AC signal is generated by a signal generating system comprising: a memory, wherein the memory stores control instructions for the one or more point defects; one or more processors; and one or more programs, wherein the one or more programs are stored in the memory and configured to be executed by the one or more processors, the one or more programs when executed by the one or more processors cause the processor to: generate pulse data based on the control instructions; insert pulse phase data into the pulse data based on the control instructions; insert pulse amplitude data into the pulse data based on the control instructions; and insert a pulse frequency into the pulse data based on the control instructions; and generate the AC signal based on the pulse data.

In one or more examples, a non-transitory computer readable storage medium stores one or more programs for scalable control of point defect qubits, for execution by one or more processors of an electronic device that, when executed by the device, cause the device to: at a microwave line disposed proximally to a diamond waveguide array comprising one or more diamond waveguides, wherein the one or more diamond waveguides comprise one or more point defects, apply a direct current (DC) signal, wherein the DC signal is configured to shift an energy level of each point defect of the one or more point defects based on a position of the point defect in the diamond waveguide array; and apply, at the microwave line, an alternating current (AC) signal, wherein the AC signal is configured to control a quantum state of a point defect of the one or more point defects, wherein one or more properties of the electromagnetic signal are based on the shift in the energy level induced by the DC signal.

In one or more examples, the diamond waveguide array comprises at least eight diamond waveguides.

In one or more examples, the one or more point defects comprise nitrogen vacancies.

In one or more examples, the at least one diamond waveguide comprises at least two point defects.

In one or more examples, at least one photonic waveguide is optically coupled to the diamond waveguide array and is configured to receive photons emitted by the one or more point defects.

In one or more examples, the at least one photonic waveguide comprises silicon nitride.

In one or more examples, the microwave line is aligned perpendicularly to the one or more diamond waveguides in the diamond waveguide array.

In one or more examples, the AC signal is generated by a signal generating system comprising: a memory, wherein the memory stores control instructions for the one or more point defects; one or more processors; and one or more programs, wherein the one or more programs are stored in the memory and configured to be executed by the one or more processors, the one or more programs when executed by the one or more processors cause the processor to: generate pulse data based on the control instructions; insert pulse phase data into the pulse data based on the control instructions; insert pulse amplitude data into the pulse data based on the control instructions; and insert a pulse frequency into the pulse data based on the control instructions; and generate the optimized signal based on the pulse data.

BRIEF DESCRIPTION OF THE FIGURES

The invention will now be described, by way of example only, with reference to the accompanying drawings.

FIG. 5 illustrates an exemplary system for controlling individual qubits in an array of diamond waveguides according to one or more examples of the present disclosure.

FIG. 8 illustrates an exemplary method for generating an electromagnetic pulse configured to control the quantum state of a point defect qubit at a selected frequency address according to one or more examples of the present disclosure.

DETAILED DESCRIPTION OF THE DISCLOSURE

Figure 1:
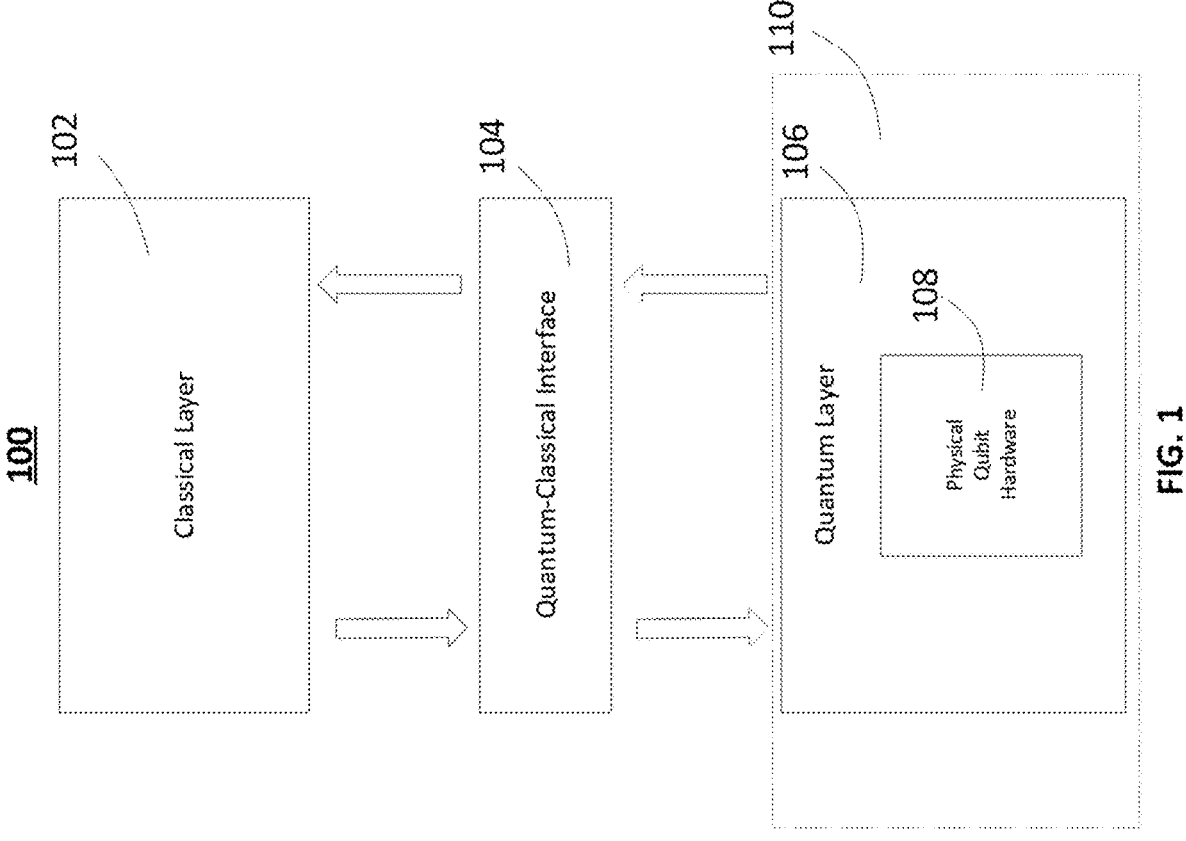
FIG. 1 illustrates a quantum computing system according to one or more examples of the present disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure, in one or more examples, also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

Classical computers perform calculations using information represented by binary digits (or "bits" for short). Each bit in a classical computing system can occupy one of two discrete states: a first state ("0") or a second state ("1"). In the absence of any external forces, a classical system such as a bit will occupy a single, well-defined state indefinitely. Quantum computers, on the other hand, perform calculations using information encoded in the quantum states of two-state quantum systems called "quantum bits" (or "qubits" for short). A quantum system can "collapse", with a certain probability, to any physically allowed state when a measurement of the system's state is performed. Since the measurement result is probabilistically determined, several measurements of the state of the same quantum system will not necessarily yield the same result. This is because, unlike a classical system—which can only exist in one of its possible states—a quantum system such as a qubit can exist in any "superposition" (i.e., combination) of the independent, physically distinguishable quantum states in which the system can be observed or measured. This superposition state contains information about each of the possible independent quantum states as well as information related to the probability of observing the quantum system in each of the possible independent states. Since a quantum superposition state contains more information than a classical state, a single qubit (which can exist in any superposition of two independent states) is capable of representing a greater amount of information than a single classical bit (which can exist in only a single state at a time). As a result, quantum computers are theorized to be capable of solving complex computational problems which classical computers are incapable of solving in practical amounts of time.

Although quantum computing systems have the potential to solve problems that classical computers cannot, quantum computing systems present various design challenges. Quantum computers store information in the quantum states of qubits; as such, the ability to accurately and precisely control the quantum states of qubits is absolutely essential to the development of scalable, functioning quantum computing systems. Quantum systems, however, are inherently fragile; as such, storing information in a quantum state for extended periods of time is difficult. Small fluctuations (e.g., thermal fluctuations) in the environment surrounding a system of qubits, for example, can disturb the state of the system and cause "decoherence", which renders the quantum information contained in the qubit system inaccessible. One method of controlling the qubit states is to house systems of qubits in cryogenic environments (i.e., environments at temperatures below about −180° C./−292° F./93 K). Maintaining the controlled environment at cryogenic temperatures can reduce thermal fluctuations in the controlled environment, which may otherwise disturb the state of the qubit system. However, maintaining the environment at cryogenic temperatures means any physical hardware used within the controlled environment must be capable of operating efficiently in a cryogenic environment. In addition, other mechanisms of qubit control beyond controlling the environment are needed in order to successfully perform quantum computations. These control mechanisms need to be scalable, accurate, and capable of functioning alongside one another. FIG. 1 illustrates an exemplary quantum computing system according to one or more examples of the present disclosure. As shown, the quantum computing system 100 includes a classical layer 102, a classical-quantum interface 104, and a quantum layer 106. In one or more examples, the quantum computing system 100 can be configured to perform computations by recording information during the "collapsed" state of qubits when they are being measured, extracting this information via the classical-quantum interface 104, and relaying the information to the classical layer 102 where it can be processed and analyzed.

The classical layer 102 can include traditional computing devices such as CPUs and GPUs. In one or more examples, the classical layer 102 may include one or more user interfaces configured to receive input from a user. In one or more examples, the classical layer 102 may include one or more displays. The displays may be configured to provide users with information related to computations being performed by quantum computing system 100. In one or more examples, the classical layer 102 can be configured to compile instructions for a given quantum algorithm to be executed by the quantum computing system 100. In one or more examples, the classical layer 102 can process quantum-state measurements received from the classical-quantum interface 104 after the quantum algorithm is executed. Executing the quantum algorithm can include generating a series of signals such as voltage sweeps, microwave pulses, optical pulses, etc., via a suitable device.

The quantum layer 106 can be contained in a controlled environment 110 and can include physical qubit emitters 108. In one or more examples, the controlled environment 110 can be maintained at cryogenic temperatures. For example, the controlled environment may be maintained at temperatures below about −180° C./−292° F./93 K.

In one or more examples, the physical qubit emitters 108 can be configured to generate physical implementations of qubits—i.e., configured to generate and encode information in the quantum states of a plurality of two-state quantum systems. The physical qubit emitters 108 can generate a variety of physical implementations of qubits. Such physical implementations can include, in non-limiting examples, electrons, which can occupy a superposition state that is a combination of a spin up state and a spin down state; photons, which can occupy a superposition state that is a combination of a horizontal polarization state and a vertical polarization state; and superconducting "islands" formed using Josephson junctions, which can occupy a superposition state that is a combination of an uncharged state and a charged state. In one or more examples, physical qubit emitters 108 may generate "hybrid" quantum systems which combine multiple quantum degrees of freedom—for example, a hybrid qubit formed from a coupling of an electron and a photon. As explained above, the qubit is the quantum analogue to a classical bit. Accordingly, in one or more examples, the physical qubit hardware 108 can be the quantum analog to transistors, which control bits in a classical computer.

In one or more examples, information may be transmitted between the classical layer 102 and the quantum layer 106 via a classical-quantum interface 104. For instance, a user may provide an algorithm or a problem to be solved to a computing device in the classical layer 102. The classical layer 102 can compile instructions based on the provided algorithm or problem and provide those instructions to the classical-quantum interface 104, which can then create the various kinds of signals necessary to control the qubits in the quantum layer 106 based on the instructions.

The classical-quantum interface 104 may comprise one or more classical circuits configured to perform a plurality of tasks related to controlling the states of the qubits generated in quantum hardware layer 106. Such circuits may include digital-to-analogue converters, amplifiers, which may facilitate the transmission of information between qubits, as well as field-programmable gate arrays (FPGAs) and application-specific integrated circuits (ASICs), which may be implemented in feedback systems configured to control the qubit states based on measurements of the states of the qubits. Once necessary information has been extracted from the quantum layer 106, it may be uploaded to classical layer 102 for further processing and analysis.

Qubits, as discussed above, can be represented by any two-state quantum system. Qubits can also be implemented using "hybrid" systems which employ correlations between the quantum state of one system (e.g., an electron) and the quantum state of another system (e.g., a photon). One method of generating these hybrid qubits harnesses physical properties of so-called "point defects" in the atomic structure of diamond. As explained below, information can be encoded in the quantum states of free electrons at a point defect site in a diamond lattice. When these electrons move between energy levels, they emit photons whose quantum states are correlated with the electrons' quantum states. Measuring properties (e.g., frequency, intensity, number, etc.) of these photons can provide information about the quantum states of the electrons; this information, in turn, may be used to control the quantum states of the electrons. These photons may also be routed away from the point defect site (e.g., to another component of an optoelectronic system) for further entanglement.

The present disclosure is directed to systems and methods for controlling quantum states of qubits encoded into point defects in diamond. Since qubits are a fundamental component of quantum computing, the ability to accurately control qubits is essential to the development of scalable, functional quantum computers. The correspondence between the quantum states of the electrons and the quantum states of the photons emitted from point defect sites in diamond allows the quantum state of the photons to be controlled by controlling the quantum states of the electrons (and vice versa). Information encoded in the electrons' quantum states can thus be networked across large systems of qubits by allowing interactions between the photons emitted from different point defects within the system. The systems and methods described herein exploit this correspondence in order to precisely modulate the states of qubits encoded in point defect sites in close-packed arrays of diamond waveguides.

Figure 2:
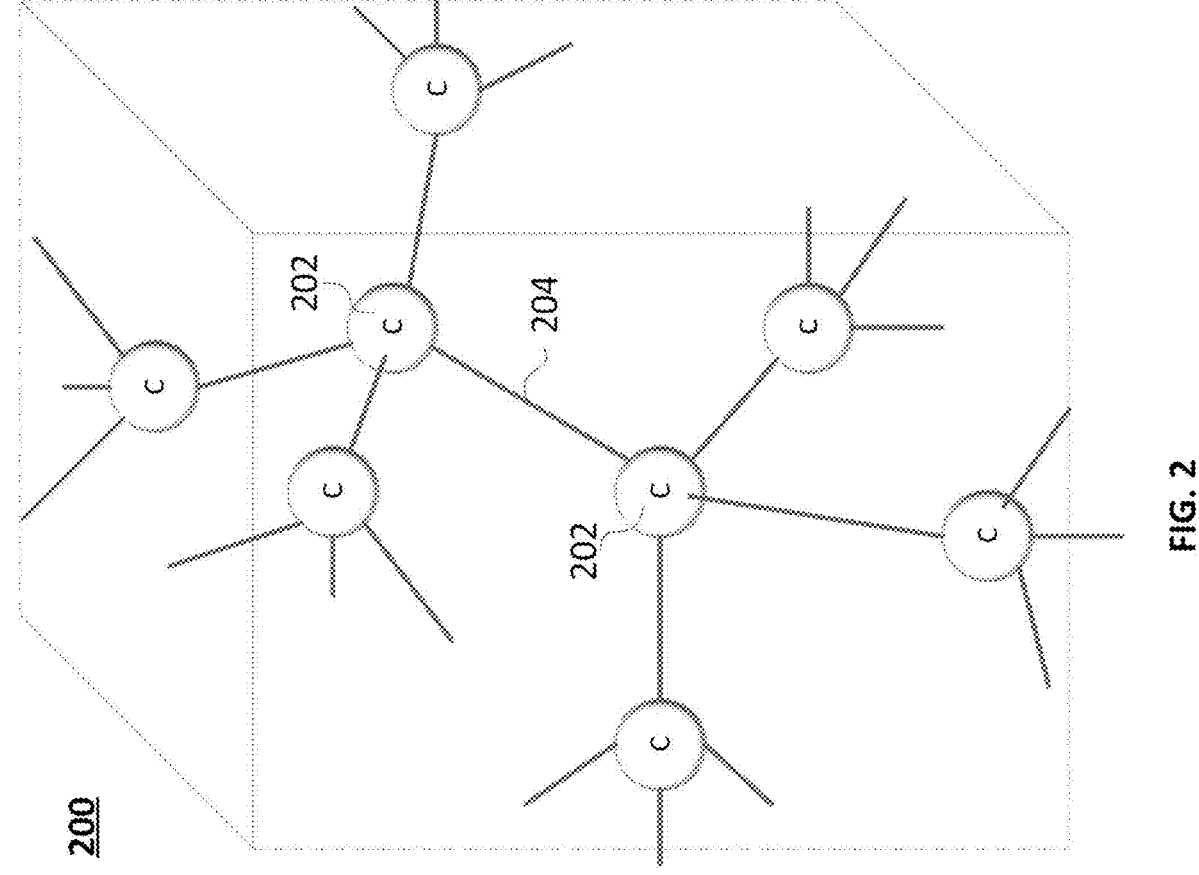
FIG. 2 illustrates an exemplary atomic structure of diamond according to one or more examples of the present disclosure.

FIG. 2 illustrates an exemplary atomic structure of diamond according to examples of the disclosure. Specifically, FIG. 2 shows a unit 200 of a diamond lattice comprising carbon atoms 202 arranged in a crystal structure. In one or more examples, each carbon atom of carbon atoms 202 may be joined to its four nearest neighbors by covalent bonds 204 formed by shared pairs of electrons. Since a carbon atom has four valence electrons, and each carbon atom of carbon atoms 202 can be bonded to its four nearest neighbors, each valence electron of each carbon atom of carbon atoms 202 can be used in a bond 204. Therefore diamond (in theory) does not contain any free electrons.

In reality, various points in the crystal structure of diamond may have defects. Imperfections in the lattice can arise naturally while the diamond is forming or can be introduced by an external source during or after the diamond's formation. In some cases, one or more carbon atoms may be missing from the lattice. The vacancy left by the missing carbon atoms may be implanted (naturally or artificially) with a non-carbon atom. These "point defects" (also known as "color centers" due to their effect on the diamond's color) can be used to form artificial atoms which have free electrons. The free electrons can jump from a low energy ground state to a higher energy excited state upon absorption of excitation light at appropriate frequencies. After some time, the excited electrons will return to their ground states, emitting photons in the process. The quantum states of the emitted photons will be correlated with the quantum states of the electrons. Certain properties (e.g., the frequency) of the emitted photons may provide information about the quantum states of the electrons and, therefore, about any information encoded in the electrons' quantum states. Hence, the quantum states of the electrons may be controlled by controlling the photons emitted by the point defect sites (and vice versa).

Figure 3:
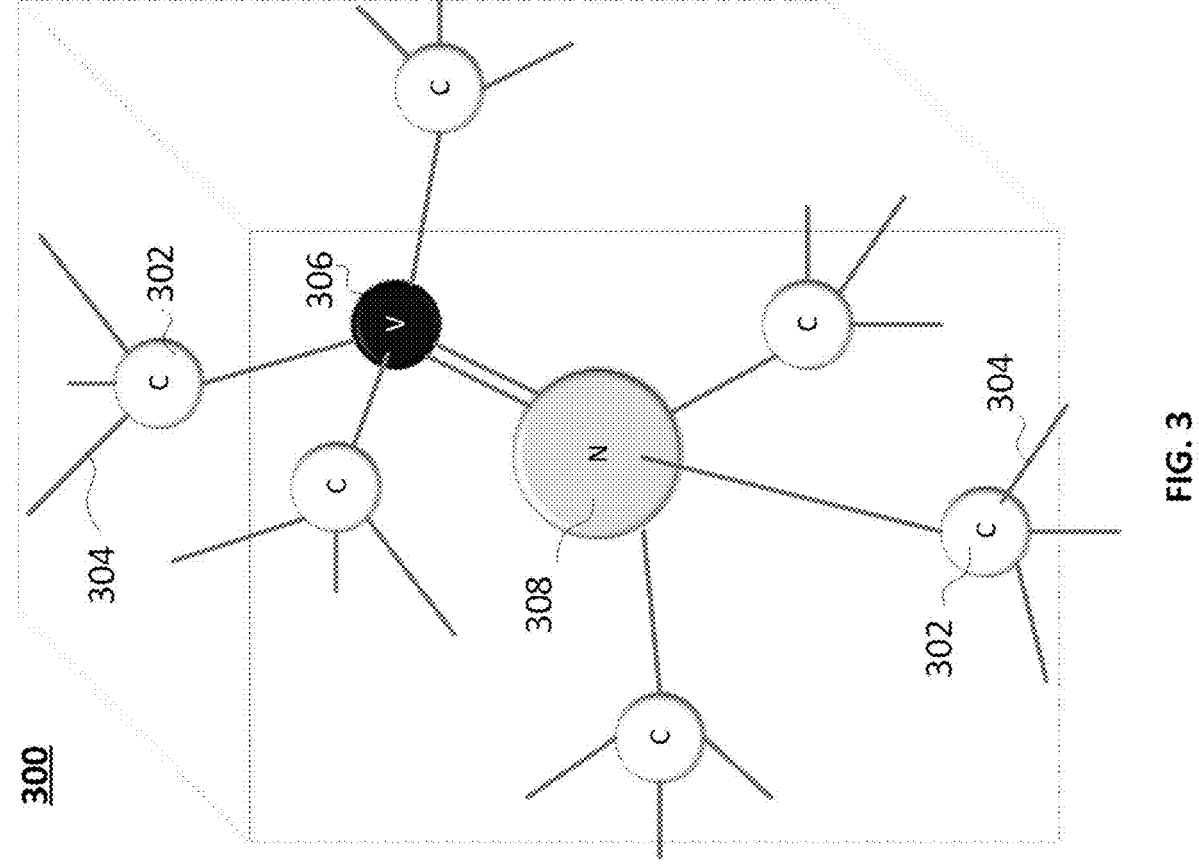
FIG. 3 illustrates an exemplary point defect site in diamond according to one or more examples of the present disclosure.

FIG. 3 illustrates an exemplary point defect site according to examples of the disclosure. Specifically, FIG. 3 shows a nitrogen vacancy (NV) site, a type of point defect site. Like lattice unit 200 shown in FIG. 2, lattice unit 300 may include a plurality of carbon atoms 302 joined by covalent bonds 304. However, unlike lattice unit 200, lattice unit 300 may have a vacancy 306 wherein a carbon atom is missing. A nitrogen atom 308 may occupy the space in the lattice near vacancy 306 in place of another carbon atom. Other types of point defect sites—for example, group IV defect sites—may have similar structures and, therefore, similar physical properties to NV sites.

As discussed above, physical representations of qubits may be created by encoding quantum information in point defect sites (e.g., NV sites). As used herein, the term "point defect qubit" may refer to a qubit encoded in a point defect site (e.g., a NV or group IV defect site) in a diamond lattice.

In one or more examples, one or more point defect sites may be implanted in the diamond lattice of a diamond waveguide to form a "quantum emitter"—i.e., a physical device that emits photons signifying the quantum states of the point defect qubits encoded in the point defect sites. Quantum computing systems may require systems of close-packed quantum emitters so that the quantum states of multiple point defect qubits in a system can be entangled via photon-mediation, thereby allowing complex computations to take place. Controlling such systems of quantum emitters requires precise knowledge and control of the quantum states of the point defect qubits. In one or more examples, the quantum states and photon emission behavior of point defect qubits may be controlled using pulses of electromagnetic waves (e.g. microwaves).

Figures 4A, 4B, 4C:
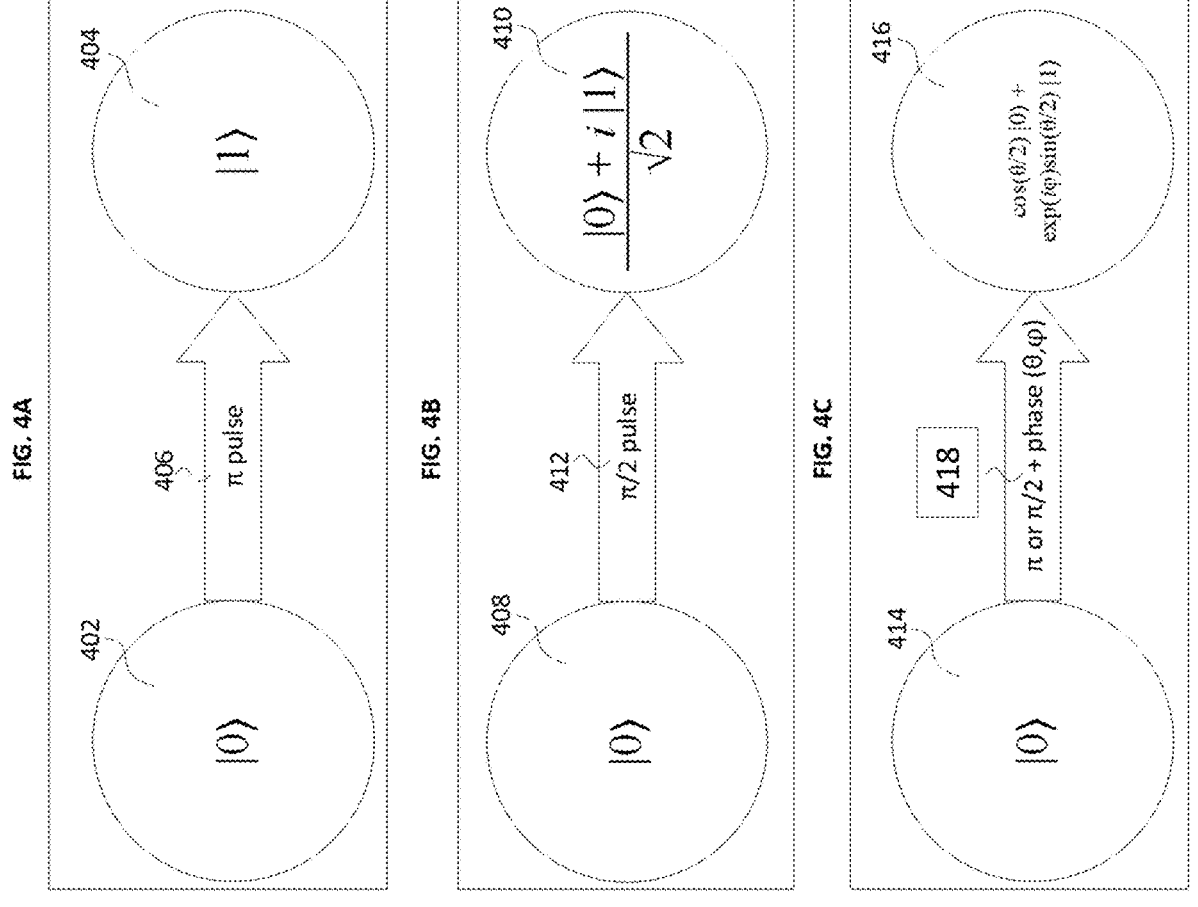
FIGS. 4A-4C illustrate exemplary processes for controlling the quantum state of a qubit encoded in a point defect site using electromagnetic signals according to one or more examples of the present disclosure.

FIGS. 4A-4C illustrate exemplary processes for controlling the quantum state of a point defect qubit using electromagnetic signals according to one or more examples of the present disclosure. The quantum state of a point defect qubit may be any superposition of the two physically distinguishable (i.e., observable) spin states $|0\rangle$ and $|1\rangle$. In the presence of an electromagnetic field, the quantum state of the point defect qubit may change. In particular, in the presence of an electromagnetic signal with a frequency equal to the excitation frequency—i.e., the frequency difference between the $|0\rangle$ and $|1\rangle$ quantum states of the point defect qubit—the point defect qubit may oscillate between the $|0\rangle$ state and the $|1\rangle$ state at a frequency $\omega$. This frequency, known as the Rabi frequency, depends on the strength of the applied electromagnetic signal. Electromagnetic pulses with frequencies proportional to the Rabi frequency may be applied to the NV qubit in order to cause the qubit to transition to a desired quantum state.

FIG. 4A illustrates an exemplary method of causing a point defect qubit (represented by the circles) to transition from a $|0\rangle$ state 402 to a $|1\rangle$ state 404. As shown, such a transition may be induced by applying a "$\pi$ pulse" 406. $\pi$ pulse 406 may be an electromagnetic signal with a period equal to $$\frac{\pi}{\omega},$$

where $\omega$ is the Rabi frequency of the point defect qubit.

FIG. 4B illustrates an exemplary method of causing a point defect qubit to transition from a $|0\rangle$ state 408 to a final state 410 which is an equally weighted superposition of the $|0\rangle$ and the $|0\rangle$ states. As shown, such a transition may be induced by applying a $$\text{``}\frac{\pi}{2}\text{pulse''}$$

412.

$$\frac{\pi}{2}$$

pulse 412 may be an electromagnetic signal with a period equal to $$\frac{\pi}{2\omega},$$

where $\omega$ is the Rabi frequency of the point defect qubit.

FIG. 4C illustrates an exemplary method of causing a point defect qubit to transition from a $|0\rangle$ state 414 to a final state 416. As shown, final state 416 may be any superposition of the $|0\rangle$) and the $|1\rangle$ states. In one or more examples, such a transition may be induced by applying a generalized pulse 418. Generalized pulse 418 may be generated by changing the phase of either a $\pi$ pulse or a $$\frac{\pi}{2}$$

pulse. In one or more examples, the amplitudes of the $|0\rangle$) and the $|1\rangle$ states in final state 416 may depend on parameters $\theta$ and $\varphi$ which may, in turn, depend on the chosen phase of generalized pulse 418. Thus, by choosing a suitable phase of generalized pulse 418, the point defect qubit may be caused to transition to any desired final state 416.

Using the methods described with respect to FIGS. 4A-4C to control individual, isolated point defect qubits is well established. However, targeted electromagnetic control of individual point defect qubits in close-packed systems of point defect qubits (i.e., individual qubits in a device comprising multiple quantum emitters) has been an outstanding challenge in the development of functional quantum computing systems. The present disclosure provides systems and methods for selectively controlling individual point defect qubits in systems of multiple point defect qubits.

FIG. 5 illustrates an exemplary system for selective control of individual point defect qubits in an array of diamond waveguides according to one or more examples of the present disclosure. Specifically, FIG. 5 shows a system 500 comprising a microwave line 502 disposed proximally to an array of diamond waveguides 504. Diamond waveguides 504 may form a quantum micro-chiplet which may be optically coupled to a series of photonic waveguides 506. In one or more examples, system 500 may be a component of a larger optoelectronic system. In particular, in one or more examples, system 500 may be a component of a quantum computing system (e.g., quantum computing system 100 shown in FIG. 1). In one or more examples, system 500 may be configured to operate in a cryogenic environment.

In one or more examples, system 500 may comprise between 1-5, 5-10, 10-15, 15-20, or 20-25 diamond waveguides 504. In one or more examples, system 500 may comprise greater than or equal to 25 diamond waveguides 504. Each diamond waveguide 504 may comprise one or more point defect sites 508, each of which may encode a point defect qubit. In one or more examples, a diamond waveguide 504 may comprise between 1-10, 10-20, 20-30, 30-40, or 40-50 point defect sites 508. In one or more examples, a diamond waveguide 504 may comprise greater than or equal to 50 point defect sites 508. Point defect sites 508 may comprise any structural defects in diamond having an associated spin degree of freedom. For example, point defect sites 508 may include nitrogen vacancies (NV), tin vacancies (SnV), silicon vacancies (SiV), germanium vacancies (GeV), or lead vacancies (PbV).

Photonic waveguides 506 may be configured to receive photons that are emitted from point defect sites 508 in diamond waveguides 504. Photonic waveguides 506 may be formed from any material capable of transmitting light in a frequency range which includes the possible frequencies of light that can be emitted by point defect sites 508. In one or more examples, photonic waveguides 506 may comprise silicon nitride (SiN). In one or more examples, system 500 may comprise between 1-5, 5-10, 10-15, 15-20, or 20-25 photonic waveguides 506. In one or more examples, system 500 may comprise greater than or equal to 25 photonic waveguides 506. Photonic waveguides 506 may be configured to route fluorescence from point defect sites 508 away from system 500 to another component of a surrounding optoelectronic system (e.g., to another component of a quantum computing system).

In one or more examples, microwave line 502 may be positioned underneath diamond waveguides 504. In one or more examples, microwave line 502 may be aligned perpendicularly to one or more of diamond waveguides 504. Microwave line 502 may be configured to simultaneously receive several electromagnetic signals. The simultaneously received electromagnetic signals may comprise both AC signals and DC signals. In one or more examples, applying a suitable combination of electromagnetic signals to microwave line 502 may uniquely perturb the energy levels of each point defect qubit at each point defect site 508, thereby allowing each point defect site to be individually targeted and controlled. Specifically, in one or more examples, applying a suitable combination of electromagnetic signals to microwave line 502 may generate a magnetic field 510 about microwave line 502. The strength of magnetic field 510 may depend inversely on the distance from microwave line 502; since each point defect site 508 may be located at a different position with respect to microwave line 502, the field strength felt by each point defect qubit may differ. As a result, the energy levels (i.e., the excitation energies) of each individual point defect qubit may change in a unique way. The unique energy level shift induced in each point defect qubit may then be used as a distinct identifier for the qubit, thereby allowing specific point defect qubits to be targeted and controlled.

In one or more examples, system 500 can include multiple microwave lines. Rather than applying AC and DC signals to a single microwave line as previously described, system 500 may include separate AC and DC microwave lines. System 500 can also include a plurality of microwave lines, each of which may be configured to receive different DC signals. For example, system 500 may comprise a pair of perpendicular microwave lines, each of which may be configured to receive distinct DC signals. Controlling the DC signals sent to these lines may provide improved control over the shape and orientation of the magnetic field that provides the qubits with their unique frequency addresses.

Figure 6:
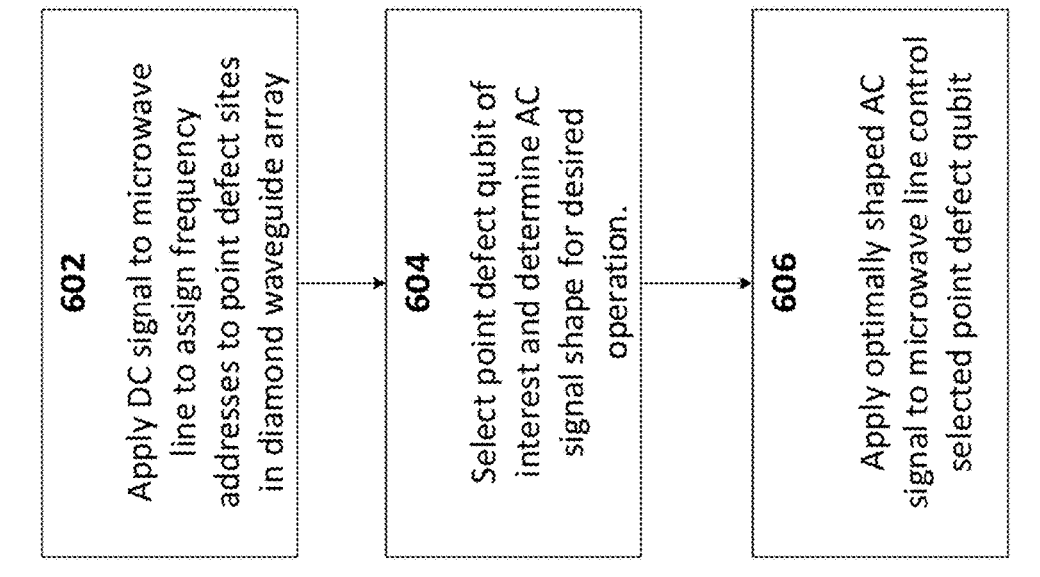
FIG. 6 illustrates an exemplary method for targeting and controlling individual qubits encoded in point defect sites using electromagnetic signals according to one or more examples of the present disclosure.

FIG. 6 illustrates an exemplary method for targeting and controlling individual point defect qubits using electromagnetic signals according to one or more examples of the present disclosure. Specifically, FIG. 6 shows a method 600 for selectively controlling an individual point defect qubit in a system of NV qubits. In one or more examples, a system configured to execute one or more steps of method 600 may comprise an array of diamond waveguides disposed atop a microwave line (see, e.g., system 500 shown in FIG. 5).

In one or more examples, method 600 may initiate at step 602, wherein a DC signal may be applied to the microwave line. The DC signal may generate a magnetic field that grows weaker with increasing distance from the microwave line. As such, each point defect qubit may be exposed to a magnetic field whose strength depends on that point defect qubit's position in the diamond waveguide array. The magnetic field may induce a shift in each point defect qubit's energy levels, thereby changing each point defect qubit's excitation frequency. In one or more examples, each point defect qubit may be encoded in a point defect site located at a unique position in the diamond waveguide array and, as a result, each point defect qubit may experience a unique change in excitation frequency due to the spatial dependence of the magnetic field strength. Therefore, applying the DC current in step 602 may effectively assign a unique "frequency address" to each point defect sites, thereby allowing previously indistinguishable point defect qubits to be selectively targeted.

The DC signal may have a voltage of any magnitude (barring practical concerns, e.g., localized heating from the current). In one or more examples, the DC signal may have a negative voltage or a positive voltage. In one or more examples, the DC signal may have a current between 0 and 150 mA. In one or more examples, the DC signal may have a current greater than 150 mA. In one or more examples, applying a DC signal having a higher voltage may generate a steeper magnetic field gradient, thereby allowing closer-packed qubits to be resolved (i.e., assigned frequency addresses).

In one or more examples, after the DC signal has been applied to the microwave line in step 602, method 600 may proceed to step 604, wherein a point defect qubit of interest may be selected and a shape of an AC signal to be applied to the microwave line may be determined. The DC signal applied in step 602 may be maintained while step 604 is being executed. In one or more examples, selecting a point defect qubit of interest may comprise identifying a desired frequency address corresponding to the point defect site in which the point defect qubit of interest is encoded. The AC signal to be applied to the microwave line may be a signal configured to perform a desired control operation on the selected point defect qubit. For instance, the AC signal to be applied may be configured to cause the selected point defect qubit to transition from a current quantum state to a new quantum state. Specifically, in one or more examples, the shape (i.e., the time-dependent amplitude and phase) of the AC signal may be chosen based on the desired control operation. The shape of the AC signal may be determined based on the selected point defect qubit's frequency address (i.e., the excitation frequency of the selected point defect qubit in the presence of the magnetic field generated by the DC signal applied in step 602). In one or more examples, the shape of the AC signal may be based on a current quantum state of the selected point defect qubit and/or a desired future quantum state of the selected point defect qubit. In one or more examples, determining the shape of the AC signal may comprise selecting a pulse type (e.g., a t pulse and/or a $$\frac{\pi}{2}$$

pulse) along with a desired pulse frequency, pulse phase, and/or pulse amplitude. In one or more examples, a desired pulse frequency may be in the microwave range (i.e., between about 300 MHz and about 300 GHz).

After a point defect qubit of interest has been selected and an AC pulse shape has been determined in step 604, method 600 may proceed to step 606, wherein an AC signal having the determined shape may be applied to the microwave line. The DC signal applied in step 602 may be maintained while step 604 is being executed. In one or more examples, applying the AC signal to the microwave line may cause a desired operation to be performed on the quantum state of the selected point defect qubit.

In one or more examples, it may be necessary to simultaneously control multiple adjacent point defect qubits in an identical manner. In such cases, method 600 may be used, but step 602 may be skipped. Skipping the application of the DC signal may effectively assign the same frequency address to each of the adjacent point defect qubits, i.e., may prevent the adjacent qubits from being resolved. Method 600 may instead begin at step 604, wherein an AC signal shape configured to simultaneously control the multiple adjacent point defect qubits may be determined. Then, at step 606, an AC signal having the determined shape may be applied to the microwave line in order to perform a desired control operation simultaneously on the quantum states of each of the adjacent point defect qubits.

Figure 7:
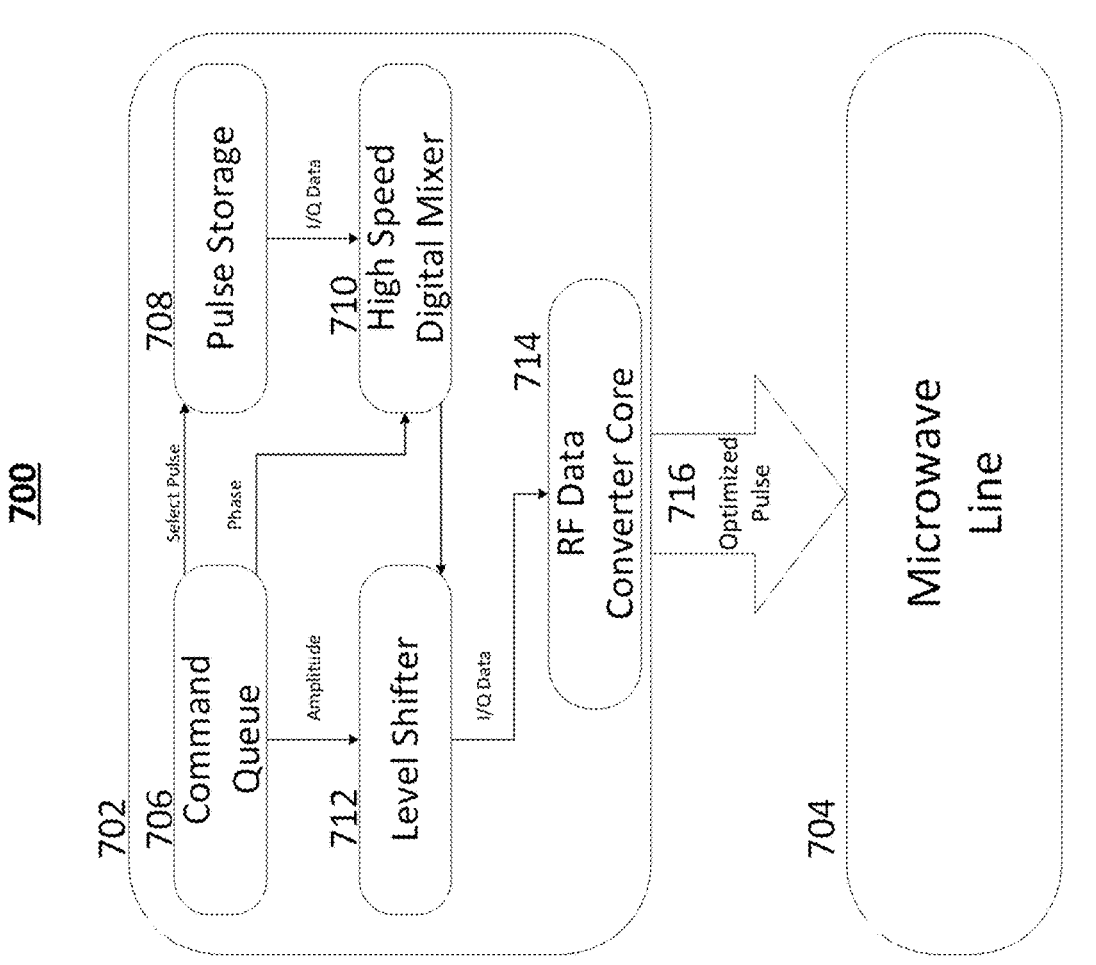
FIG. 7 illustrates an exemplary system for generating an electromagnetic pulse configured to control the quantum state of a point defect qubit at a selected frequency address according to one or more examples of the present disclosure.

FIG. 7 illustrates an exemplary system for generating an electromagnetic pulse configured to control the quantum state of a point defect qubit at a selected frequency address according to one or more examples of the present disclosure. Specifically, FIG. 7 shows a system 700 comprising a signal generating system 702 and a microwave line 704. In one or more examples, microwave line 704 may be a component of a system controlling individual qubits in an array of diamond waveguides (e.g., system 500 shown in FIG. 5). Signal generating system 702 may be configured electrically communicate with microwave line 704 and to generate an electromagnetic pulse having a pulse shape that has been optimized to control the point defect qubit at the selected frequency address. In one or more examples, system 700 may constitute a portion of a larger optoelectronic system (e.g., a quantum computing system).

In one or more examples, signal generating system 702 may comprise a memory and one or more processors. In one or more examples, memory may be configured to store control instructions for one or more point defect qubits encoded in one or more point defect sites. In one or more examples, the memory may be configured to store one or more programs that, when executed by the processors, generate an electromagnetic pulse that is optimized to control the selected point defect qubit. In one or more examples, signal generating system 702 may comprise one or more field programmable gate arrays (FPGAs).

Signal generating system 702 may include a command queue memory 706 configured to store control instructions for the controlling the selected point defect qubit at the selected frequency address. The control instructions stored in command queue memory 706 may be provided by one or more users. In one or more examples, the control instructions stored in command queue memory 706 may comprise information related to a type of pulse (e.g., a 71 pulse and/or a $$\frac{\pi}{2}$$

pulse), a pulse frequency, a pulse phase, and/or a pulse amplitude.

In one or more examples, upon receiving an external trigger, signal generating system 702 may be configured to cause command queue memory 706 to transmit one or more stored control instructions to a pulse storage 708, a high-speed digital mixer 710, and/or a level shifter 712. The external trigger may be a digital voltage pulse configured to initiate the generation of the optimized AC signal. In one or more examples, the digital voltage pulse may be between 0-1 V, 0-2 V, 0-3V, 0-4 V, or 0-5 V. In one or more examples, the external trigger may be configured to synchronize the electromagnetic pulses applied to microwave line 704 with other electromagnetic pulses being applied elsewhere in the optoelectronic system containing system 700.

In one or more examples, pulse storage 708 may be configured to receive information related to a type of pulse from command queue memory 706. In one or more examples, high speed digital mixer 710 may be configured to receive information related to a pulse phase from command queue memory 706. In one or more examples, level shifter 712 may be configured to receive information related to a pulse amplitude from command queue memory 706.

Upon receiving information related to a type of pulse from command queue memory 706, pulse storage 708 may be configured to transmit pulse data to high-speed digital mixer 710. The pulse data may represent a 7L pulse and/or a $$\frac{\pi}{2}$$

pulse. In one or more examples, the pulse data transmitted by pulse storage 708 may comprise in-phase (I) and out-of-phase (Q) components of the pulse. In one or more examples, high speed digital mixer 710 may use the pulse data received from pulse storage 708 and the received information related to the pulse phase in order to insert pulse phase data into the pulse data. High speed digital mixer 710 may then transmit the pulse data, with the inserted phase data, to level shifter 712. In one or more examples, level shifter 712 may use the received pulse data and the received information related to the pulse amplitude in order to insert pulse amplitude data into the pulse data.

In one or more examples, signal generating system 702 may include a radio frequency (RF) data converter core 714 configured to receive pulse data, with the inserted pulse phase data and pulse amplitude data, from level shifter 712. RF data converter core 714 may comprise an upconverter configured to convert a frequency of the pulse described by the received pulse data to a desired frequency. The desired frequency may be based on control instructions stored in command queue memory 706. In one or more examples, RF data converter core 714 may be configured to generate an optimized electromagnetic pulse 716 based on the pulse data. Optimized electromagnetic pulse 716 may be transmitted to microwave line 704. In one or more examples, microwave line 704 may be configured to receive optimized electromagnetic pulse 716 while simultaneously receiving a DC signal.

FIG. 8 illustrates an exemplary method for generating an electromagnetic pulse configured to control the quantum state of a point defect qubit at a selected frequency address according to one or more examples of the present disclosure. Specifically, FIG. 8 shows a method 800 for generating an optimized electromagnetic pulse to control the quantum state of a point defect qubit at a selected frequency address. One or more steps of method 800 may be executed by a system comprising one or more processors and a memory configured to store control instructions for the point defect qubit. In one or more examples, one or more steps of method 800 may be executed by one or more components of a system for generating an electromagnetic pulse configured to control the quantum state of a point defect qubit at a selected frequency address (e.g., system 700 shown in FIG. 7). In one or more examples, one or more steps of method 800 may be executed as a portion of a method for targeting and controlling individual point defect qubits using electromagnetic signals. For example, step 606 of method 600 shown in FIG. 6 may include one or more steps of method 800.

In one or more examples, method 800 may begin at step 802, wherein a trigger may be received. This trigger may cause method 800 to proceed to step 804, wherein control instructions may be received. In one or more examples, the control instructions may correspond to the selected point defect qubit. In one or more examples, the control instructions may be received from a command queue memory. In one or more examples, the control instructions may comprise data related to a pulse type, a pulse phase, a pulse amplitude, and/or a pulse frequency.

After receiving the control instructions in step 804, method 800 may move to step 806, wherein pulse data may be generated. In one or more examples, generating pulse data may comprise selecting a pulse type from a pulse storage based on the received control instructions. The pulse data may represent a $$\frac{\pi}{2}$$

pulse and/or a z pulse. In one or more examples, the pulse data may comprise in-phase data and out-of-phase data for a pulse.

In one or more examples, after the pulse data has been generated in step 806, method 800 may proceed to step 808, wherein pulse phase data may be inserted into the pulse data based on the received control instructions. In one or more examples, the pulse phase data may be inserted into the pulse data using a digital mixer. Once the pulse phase data has been inserted into the pulse data in step 808, method 800 may proceed to step 810, wherein pulse amplitude data may be inserted into the pulse data based on the received control instructions. In one or more examples, the pulse amplitude data may be inserted into the pulse data using a level shifter. In one or more examples, the instructions received from the command queue memory may indicate that a pulse has zero amplitude if the quantum state of the point defect qubit at the selected frequency address should not be changed.

In one or more examples, after pulse amplitude data has been inserted into the pulse data in step 810, method 800 may proceed to step 812, wherein a pulse frequency may be inserted into the pulse data based on the received control instructions. In one or more examples, the pulse frequency may be inserted into the pulse data using a radio frequency data converter core. In one or more examples, after pulse frequency has been inserted into the pulse data in step 812, method 800 may proceed to step 814, wherein an optimized electromagnetic pulse may be generated based on the pulse data. In one or more examples, the optimized electromagnetic pulse may be transmitted to a microwave line (e.g., microwave line 502 shown in FIG. 5). The optimized electromagnetic pulse may have a shape that has been configured to cause a control operation to be performed on the quantum state of the selected point defect qubit.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A scalable point defect qubit control system comprising:
  a diamond waveguide array comprising one or more diamond waveguides, wherein the one or more diamond waveguides comprise one or more point defects; and
  a microwave line disposed proximally to the diamond waveguide array, wherein the microwave line is configured to:
    receive a direct current (DC) signal, wherein the DC signal is configured to shift an energy level of each point defect of the one or more point defects based on a position of the point defect in the diamond waveguide array; and
    receive an alternating current (AC) signal, wherein the AC signal is configured to control a quantum state of a point defect of the one or more point defects, wherein one or more properties of the AC signal are based on the shift in the energy level induced by the DC signal.

2. The system of claim 1, wherein the diamond waveguide array comprises at least eight diamond waveguides.

3. The system of claim 1, wherein the one or more point defects comprise nitrogen vacancy centers.

4. The system of claim 1, wherein the at least one diamond waveguide comprises at least two point defect sites.

5. The system of claim 1, comprising at least one photonic waveguide optically coupled to the diamond waveguide array that is configured to receive photons emitted by the one or more point defects.

6. The system of claim 5, wherein the at least one photonic waveguide comprises silicon nitride.

7. The system of claim 1, wherein the microwave line is aligned perpendicularly to the one or more diamond waveguides in the diamond waveguide array.

8. The system of claim 1, wherein the AC signal is generated by a signal generating system comprising:
  a memory, wherein the memory stores control instructions for the one or more point defects;
  one or more processors; and
  one or more programs, wherein the one or more programs are stored in the memory and configured to be executed by the one or more processors, the one or more programs when executed by the one or more processors cause the processor to:
    generate pulse data based on the control instructions;
    insert pulse phase data into the pulse data based on the control instructions;

insert pulse amplitude data into the pulse data based on the control instructions; and insert a pulse frequency into the pulse data based on the control instructions; and generate the AC signal based on the pulse data.

9. A method for scalable control of point defect qubits, the method comprising:

at a microwave line disposed proximally to a diamond waveguide array comprising one or more diamond waveguides, wherein the one or more diamond waveguides comprise one or more point defect sites, applying a direct current (DC) signal, wherein the DC signal is configured to shift an energy level of each point defect site of the one or more point defects based on a position of the point defect in the diamond waveguide array; and applying, at the microwave line, an alternating current (AC) signal, wherein the AC signal is configured to control a quantum state of a point defect of the one or more point defects, wherein one or more properties of the electromagnetic signal are based on the shift in the energy level induced by the DC signal.

10. The method of claim 9, wherein the diamond waveguide array comprises at least eight diamond waveguides.

11. The method of claim 9, wherein the one or more point defects comprise nitrogen vacancies.

12. The method of claim 9, wherein the at least one diamond waveguide comprises at least two point defect sites.

13. The method of claim 9, comprising at least one photonic waveguide optically coupled to the diamond waveguide array that is configured to receive photons emitted by the one or more point defects.

14. The method of claim 13, wherein the at least one photonic waveguide comprises silicon nitride.

15. The method of claim 9, wherein the microwave line is aligned perpendicularly to the one or more diamond waveguides in the diamond waveguide array.

16. The method of claim 9, wherein the AC signal is generated by a signal generating system comprising:

a memory, wherein the memory stores control instructions for the one or more point defects;

one or more processors; and one or more programs, wherein the one or more programs are stored in the memory and configured to be executed by the one or more processors, the one or more programs when executed by the one or more processors cause the processor to:

generate pulse data based on the control instructions;

insert pulse phase data into the pulse data based on the control instructions;

insert pulse amplitude data into the pulse data based on the control instructions; and insert a pulse frequency into the pulse data based on the control instructions; and generate the AC signal based on the pulse data.

17. A non-transitory computer readable storage medium storing one or more programs for scalable control of point defect qubits, for execution by one or more processors of an electronic device that, when executed by the device, cause the device to:

at a microwave line disposed proximally to a diamond waveguide array comprising one or more diamond waveguides, wherein the one or more diamond waveguides comprise one or more point defects, apply a direct current (DC) signal, wherein the DC signal is configured to shift an energy level of each point defect of the one or more point defects based on a position of the point defect in the diamond waveguide array; and apply, at the microwave line, an alternating current (AC) signal, wherein the AC signal is configured to control a quantum state of a point defect of the one or more point defects, wherein one or more properties of the electromagnetic signal are based on the shift in the energy level induced by the DC signal.

18. The non-transitory computer readable storage medium of claim 17, wherein the diamond waveguide array comprises at least eight diamond waveguides.

19. The non-transitory computer readable storage medium of claim 17, wherein the one or more point defects comprise nitrogen vacancies.

20. The non-transitory computer readable storage medium of claim 19, wherein the at least one diamond waveguide comprises at least two point defects.

21. The non-transitory computer readable storage medium of claim 17, comprising at least one photonic waveguide optically coupled to the diamond waveguide array that is configured to receive photons emitted by the one or more point defects.

22. The non-transitory computer readable storage medium of claim 21, wherein the at least one photonic waveguide comprises silicon nitride.

23. The non-transitory computer readable storage medium of claim 17, wherein the microwave line is aligned perpendicularly to the one or more diamond waveguides in the diamond waveguide array.

24. The non-transitory computer readable storage medium of claim 17, wherein the AC signal is generated by a signal generating system comprising:

a memory, wherein the memory stores control instructions for the one or more point defects;

one or more processors; and one or more programs, wherein the one or more programs are stored in the memory and configured to be executed by the one or more processors, the one or more programs when executed by the one or more processors cause the processor to:

generate pulse data based on the control instructions;

insert pulse phase data into the pulse data based on the control instructions;

insert pulse amplitude data into the pulse data based on the control instructions; and insert a pulse frequency into the pulse data based on the control instructions; and generate the optimized signal based on the pulse data.

* * * * *